United States Patent
Suzuki et al.

(10) Patent No.: US 7,432,822 B2
(45) Date of Patent: Oct. 7, 2008

(54) TERMINAL DEVICE

(75) Inventors: Takashi Suzuki, Kawasaki (JP);
Manabu Hongo, Kawasaki (JP);
Tomoyuki Nagamine, Kawasaki (JP);
Kazunori Murayama, Kawasaki (JP);
Haruyoshi Yada, Kawasaki (JP);
Yoshiya Matsumoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 128 days.

(21) Appl. No.: 11/386,945

(22) Filed: Mar. 23, 2006

(65) Prior Publication Data

US 2007/0120703 A1    May 31, 2007

(30) Foreign Application Priority Data

Nov. 30, 2005  (JP) ............................. 2005-346187

(51) Int. Cl.
*G08B 5/00*   (2006.01)
*H04Q 7/20*   (2006.01)
*F21V 7/04*   (2006.01)
*G01D 11/28*  (2006.01)

(52) U.S. Cl. ............................. 340/815.4; 340/815.42; 340/815.45; 340/815.75; 455/425; 455/575.3; 455/575.1; 362/26; 362/606; 362/615; 362/551; 362/555

(58) Field of Classification Search ............. 340/815.4, 340/815.42
See application file for complete search history.

(56) References Cited

U.S. PATENT DOCUMENTS

| | | | | |
|---|---|---|---|---|
| 6,011,699 A | * | 1/2000 | Murray et al. | ............... 361/814 |
| 6,600,662 B1 | * | 7/2003 | Emmert et al. | ............... 361/814 |
| 2004/0171405 A1 | * | 9/2004 | Amano et al. | ............ 455/556.2 |
| 2004/0203532 A1 | * | 10/2004 | Mizuta | ....................... 455/90.3 |

FOREIGN PATENT DOCUMENTS

| | | |
|---|---|---|
| JP | 11-355403 | 12/1999 |
| JP | 2001-292206 | 10/2001 |
| KR | 2000-0044408 | 7/2000 |

OTHER PUBLICATIONS

Notification of Submission of an Argument issued Feb. 22, 2007 by the Korean Patent Office in corresponding Korean Patent Application No. 10-2006-33806.

* cited by examiner

*Primary Examiner*—Donnie L Crosland
(74) *Attorney, Agent, or Firm*—Staas & Halsey LLP

(57) ABSTRACT

It is an object of the present invention to provide a terminal device which is not limited in the degree of freedom in terms of case design and which allows easy visual recognition of light emission for indicating a specific state even when it is carried in a chest pocket. The terminal device comprising: a stationary case (11); a movable case (13) provided on the stationary case (11) through the intermediation of a hinge (12) to allow opening and closing; and light emitting device (14) for indicating a specific state through light emission, in which the light emitting device (14) is provided at the hinge (12) side end of the stationary case (11) or the movable case (13).

4 Claims, 9 Drawing Sheets

TERMINAL DEVICE

BACKGROUND OF THE INVENTION

1. Field of the Invention

The present invention relates to a terminal device, and more specifically to a terminal device indicating with light that the device is in a specific state, such as an incoming call receiving state. The term "terminal device" covers various portable terminal device such as a mobile phone.

2. Description of the Related Technology

For example, in some mobile phones with a digital camera, when there is an incoming call or when the digital camera is being started, that state is indicated through light emitting by a light emitting diode (LED) or the like.

FIG. 9 shows a conventional mobile phone 50. The mobile phone 50 is composed of a stationary case 52 equipped with pushbuttons 51, etc. and a movable case 54 equipped with a display 53, etc. The stationary case 52 and the movable case 54 are connected together through the intermediation of a hinge 55 so as to allow opening and closing.

As shown in FIG. 10, on the outer surface (cosmetic surface) 54a of the movable case 54, there is provided a light emitting portion 56 which, when there is an incoming call or when the digital camera is being started, indicates that state through light emitting. As shown in FIG. 11, the light emitting portion 56 has an LED 58 provided on a circuit board 57 and a panel 59 arranged directly above the LED 58.

The panel 59 is provided in an opening 54b in the cosmetic surface 54a of the movable case 54. In some mobile phones, the light emitting portion is provided in the stationary case.

[Patent Document 1] JP2001-292206A
[Patent Document 2] JP11-355403A

In the conventional mobile phone 50, the panel 59 is provided in the cosmetic surface 54a of the movable case 54, so the degree of freedom in terms of case design is limited.

Further, when the mobile phone 50 is carried in a chest pocket, the light emitting portion 56 cannot be visually recognized from above, so it is impossible to recognize that the mobile phone is in a specific state, such as a state in which there is an incoming call.

This problem is not restricted to mobile phones but is involved in other portable terminal device adapted to indicate a specific state through light emitting.

SUMMARY OF THE INVENTION

The present invention has been made in view of the above problems in the prior art. It is an object of the present invention to provide a terminal device which is not limited in the degree of freedom in terms of case design and which allows easy visual recognition of light emitting for indicating a specific state even when it is carried in a chest pocket.

In order to solve the above problems, the present invention adopts the following devices.

(1) According to the present invention, there is provided a terminal device comprising: a stationary case; a movable case provided on the stationary case through the intermediation of a hinge to allow opening and closing; and light emitting device that indicates a specific state through light emitting, comprising; the light emitting device is provided at the hinge side end of one of the stationary case and the movable case.

In the present invention, the light emitting device is provided at the hinge side end of the stationary case or the movable case, so there is no need to provide the light emitting portion in the cosmetic surface of the case. Thus, it is possible to mitigate the limitation in the degree of freedom in terms of case design. Further, even when the terminal device is carried in a chest pocket, the light emitting device allows easy visual recognition from above by placing the light emitting device on the upper side, so it is possible to reliably recognize that the terminal device is in a specific state.

(2) It is desirable for the light emitting device to be provided on the hinge side end surface of at least one of the stationary case and the movable case. In this case, visual recognition of the light emission of the light emitting device can be effected still more reliably even when the terminal device is carried in a chest pocket.

(3) It is desirable to provide light reflection device that reflects the light from the light emitting device on one of the stationary case and the movable case which is not provided with the light emitting device.

In this case, even when the orientation of the terminal device will not allow direct visual recognition of the light emitting device, it is possible to recognize light emitting from reflection light from the light reflection device.

(4) It is desirable for the surface on which the light reflection device is provided on a surface differing between a state in which the movable case is open and a state in which the movable case is closed. In this case, it is possible to recognize light emission of the light emitting device regardless of whether the movable case is open or closed.

(5) The light emitting device can be constituted by an LED arranged in at least one of the stationary case and the movable case, and a light diffusion member arranged at the hinge side end of one of the stationary case and the movable case to diffuse the light from the LED.

Examples of the material of the light diffusion member comprise an acrylic resin and a PC (polycarbonate) resin that are transparent or semitransparent and milk-white or colored. In this case, the LED is arranged at a position spaced apart from the hinge, and solely the light diffusion member can be arranged in the vicinity of the hinge. As a result, it is possible to prevent the portion in the vicinity of the hinge from becoming complicated in construction and large-sized.

As described above, according to the present invention, the light emitting device indicating that the terminal device is in a specific state through light emission is provided at the hinge side end of the stationary case or of the movable case, so there is no need to provide light emitting device in the cosmetic surface of the stationary case or the movable case. Thus, it is possible to mitigate the limitation in the degree of freedom in terms of the design of the stationary case and the movable case.

Further, even when the terminal device is carried in a chest pocket, light emission from the light emitting device allows easy visual recognition from above by placing the light emitting device on the upper side, thus making it possible to reliably recognize that the terminal device is in a specific state.

DETAILED DESCRIPTION OF THE INVENTION

Figure 1:
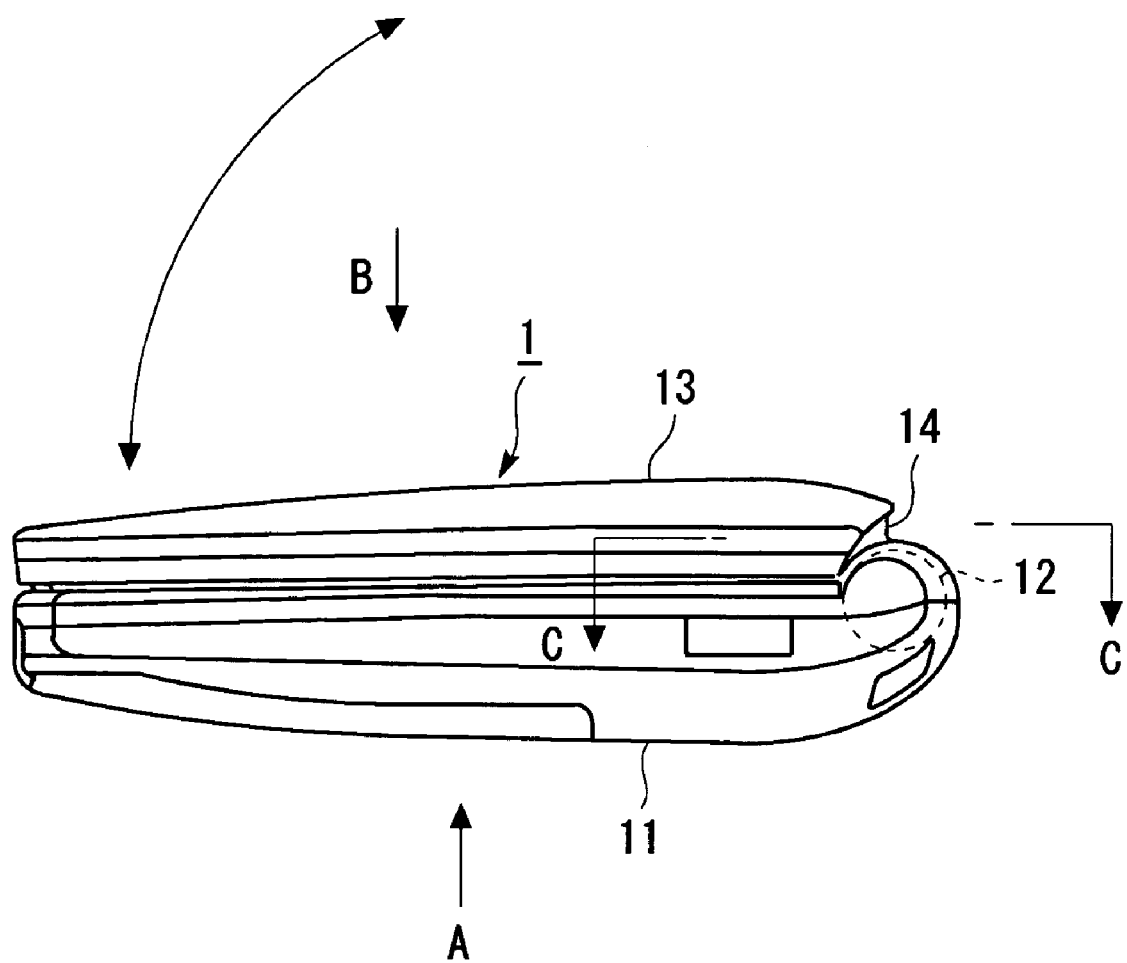
FIG. 1 is a side view showing a mobile phone according to the present invention with the movable case closed.

FIG. 1 is a side view of a mobile phone 1 to which a terminal device according to an embodiment of the present invention is applied. The mobile phone 1 is equipped with a stationary case 11, a movable case 13 connected to the stationary case 11 through the intermediation of a hinge 12 so as to allow opening and closing, and a light emitting device 14 for indicating through light emission that the mobile phone 1 is in a specific state. In the state shown in FIG. 1, the stationary cases 11 and the movable case 13 are closed.

The light emitting device 14 is provided at the hinge 12 side end of the stationary case 11 or of the movable case 13. In this embodiment, the light emitting device 14 is provided at the hinge 12 side end of the movable case 13, which has no hinge 12.

In this way, it is desirable for the light emitting device 14 to be provided in the case with no hinge 12. If the light emitting device 14 is provided in the case with the hinge 12, the portion in the vicinity of the hinge 12 will become rather complicated in construction and large-sized.

Figure 2:
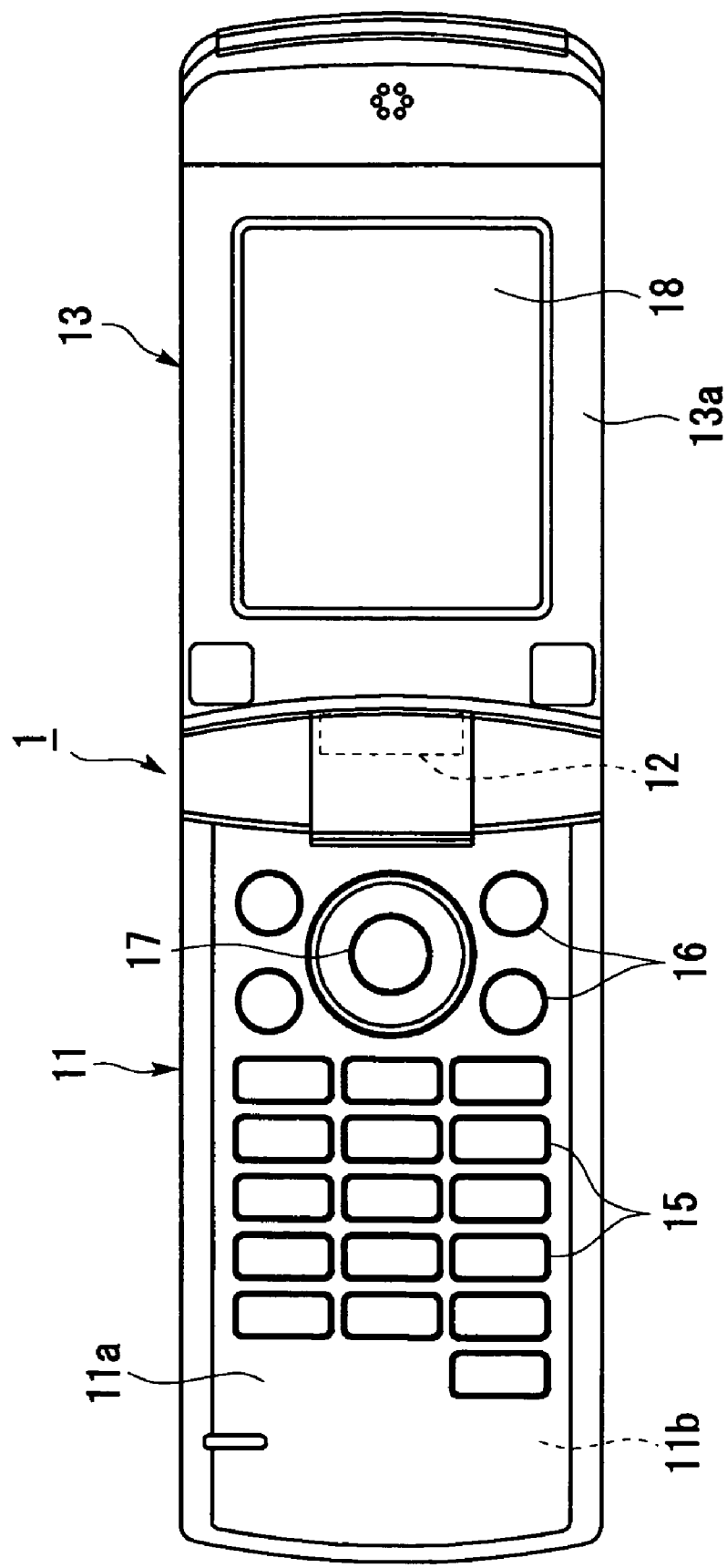
FIG. 2 is a front view showing the mobile phone according to the present invention with the movable case open.

FIG. 2 shows the mobile phone 1 with the movable case 13 open. The stationary case and the movable case 13 are formed in a flat and substantially rectangular configuration. A plurality of pushbuttons 15, 16, 17, etc. are provided on the inner surface 11a of the stationary case 11. A display 18, etc. are provided on the inner surface 13a of the movable case 13.

Figure 3:
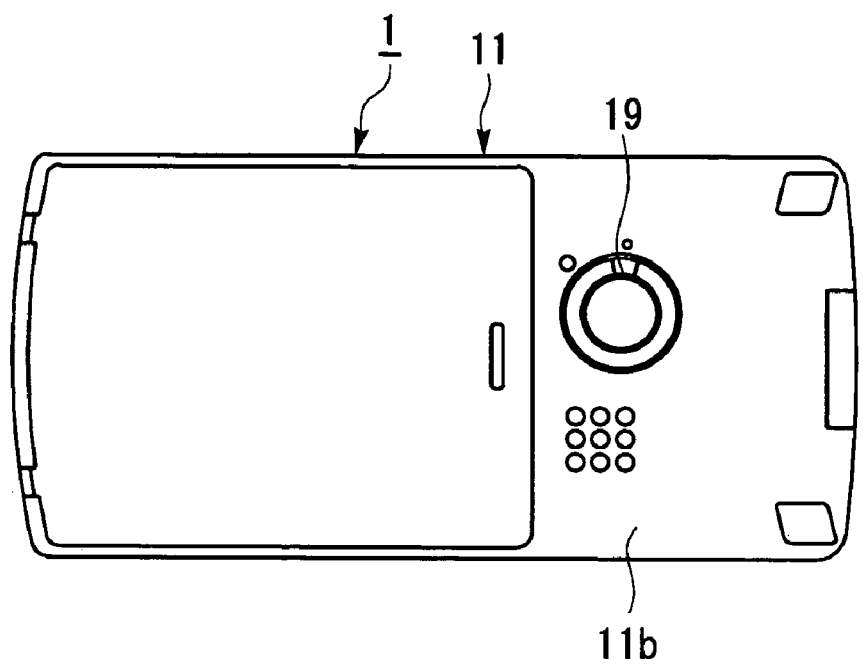
FIG. 3 is a bottom view taken in the direction of the arrow A of FIG. 1, showing the stationary case of the mobile phone according to the present invention.

The mobile phone 1 is equipped with functioning devices similar to those of an ordinary mobile phone, such as a call device (not shown). Further, as shown in FIG. 3, a digital camera 19 serving as an image pick-up device is provided on the outer surface (cosmetic surface) 11b of the stationary case 11. The call device and the digital camera 19 may be ordinary ones, so a detailed description thereof will be omitted here.

Figure 4:
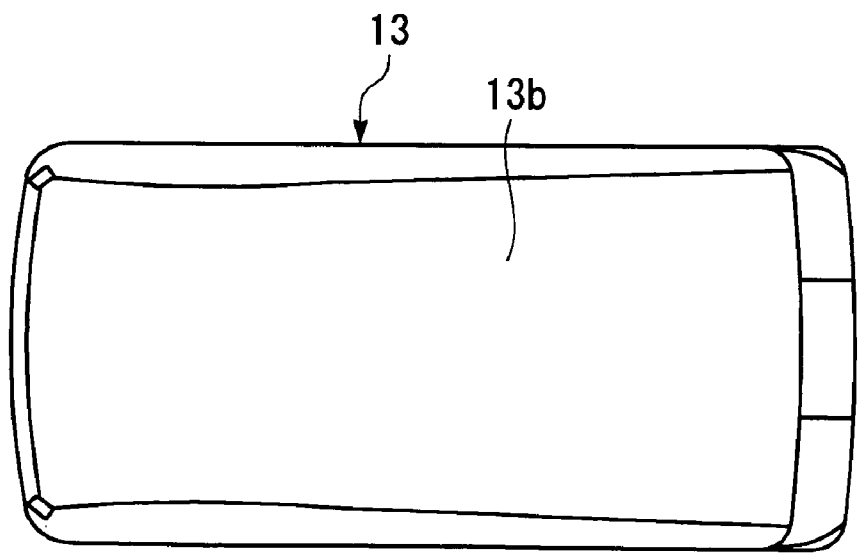
FIG. 4 is a plan view taken in the direction of the arrow B of FIG. 1, showing the movable case of the mobile phone according to the present invention.

As shown in FIG. 4, the outer surface (cosmetic surface) 13b of the movable case 13 is formed as a simple surface with no pushbuttons or the like.

In this embodiment, the light emitting device 14 emits light to indicate that the call device has received an incoming call or that the digital camera 19 is starting operation.

Figure 5:
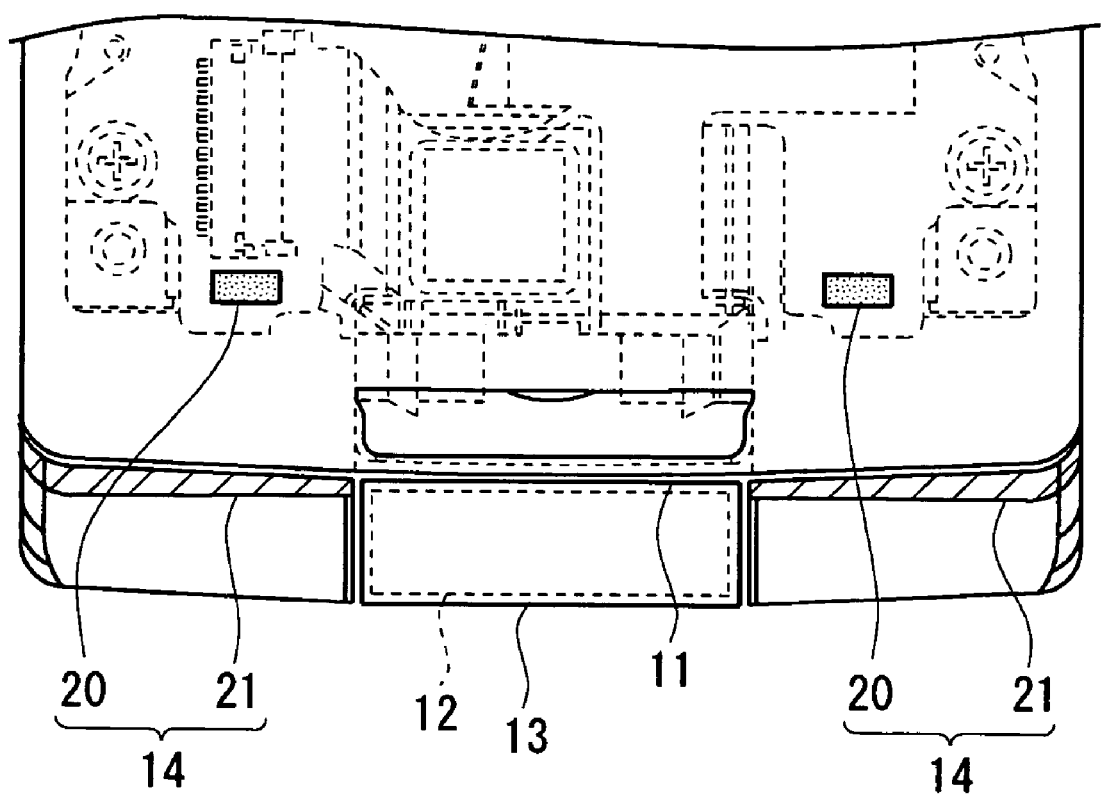
FIG. 5 is a sectional view taken along the line C-C of FIG. 1, showing the light emitting device of the mobile phone according to the present invention.

Next, the light emitting device 14 will be described. As shown in FIG. 5, the light emitting device 14 has light emitting diode (LED) 20 constituting the light emitting elements and light diffusion panel (light diffusion member) 21 for diffusing the light emitted from the LED 20.

Examples of the material of the light diffusion panel 21 comprise an acrylic resin and a polycarbonate (PC) resin that are transparent or semitransparent and milk-white or of various colors.

Figure 6:
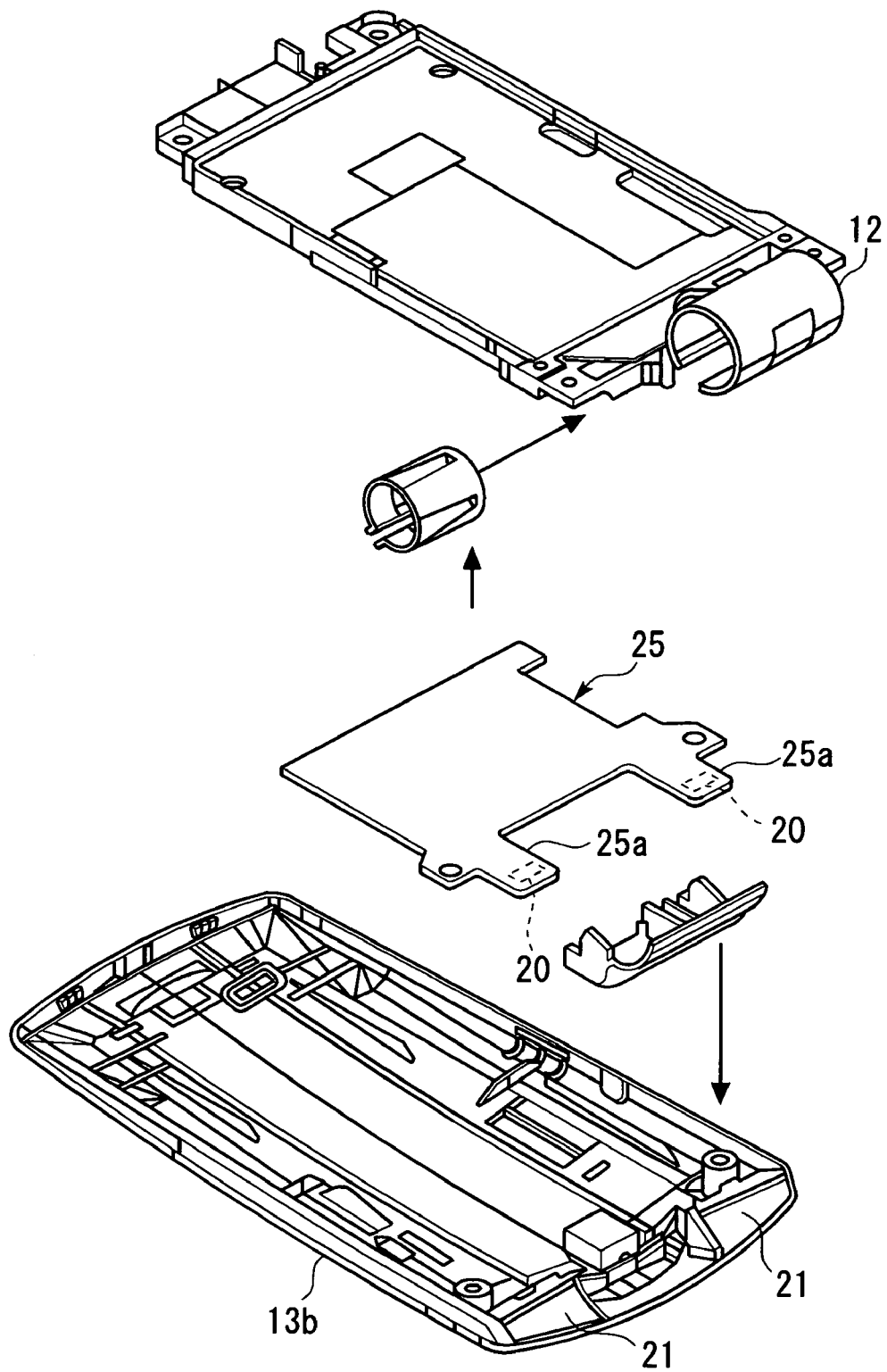
FIG. 6 is an exploded perspective view of the stationary cases of the mobile phone of the present invention.

FIG. 6 is an exploded perspective view of the movable case 13. In order that the arrangement of the LED 20 and the light diffusion panel 21 may be easily seen, FIG. 6 is presented as a view as seen from the display 18 side, with the inner surface 13b of the movable case 13 on the lower side.

As can be seen from FIG. 6, the LED 20 and the light diffusion panel 21 are provided in pairs on either side of the hinge 12 side end of the inner surface 13b of the movable case 13. The LED 20 is provided on protrusions 25a, 25a formed on either side of a circuit board 25.

The light diffusion panel 21 have a deformed pentagonal sectional configuration (see FIG. 6) and are relatively elongated. The light diffusion panel 21 is arranged at the hinge 12 side end of the inner surface 13b of the movable case 13.

Figure 7:
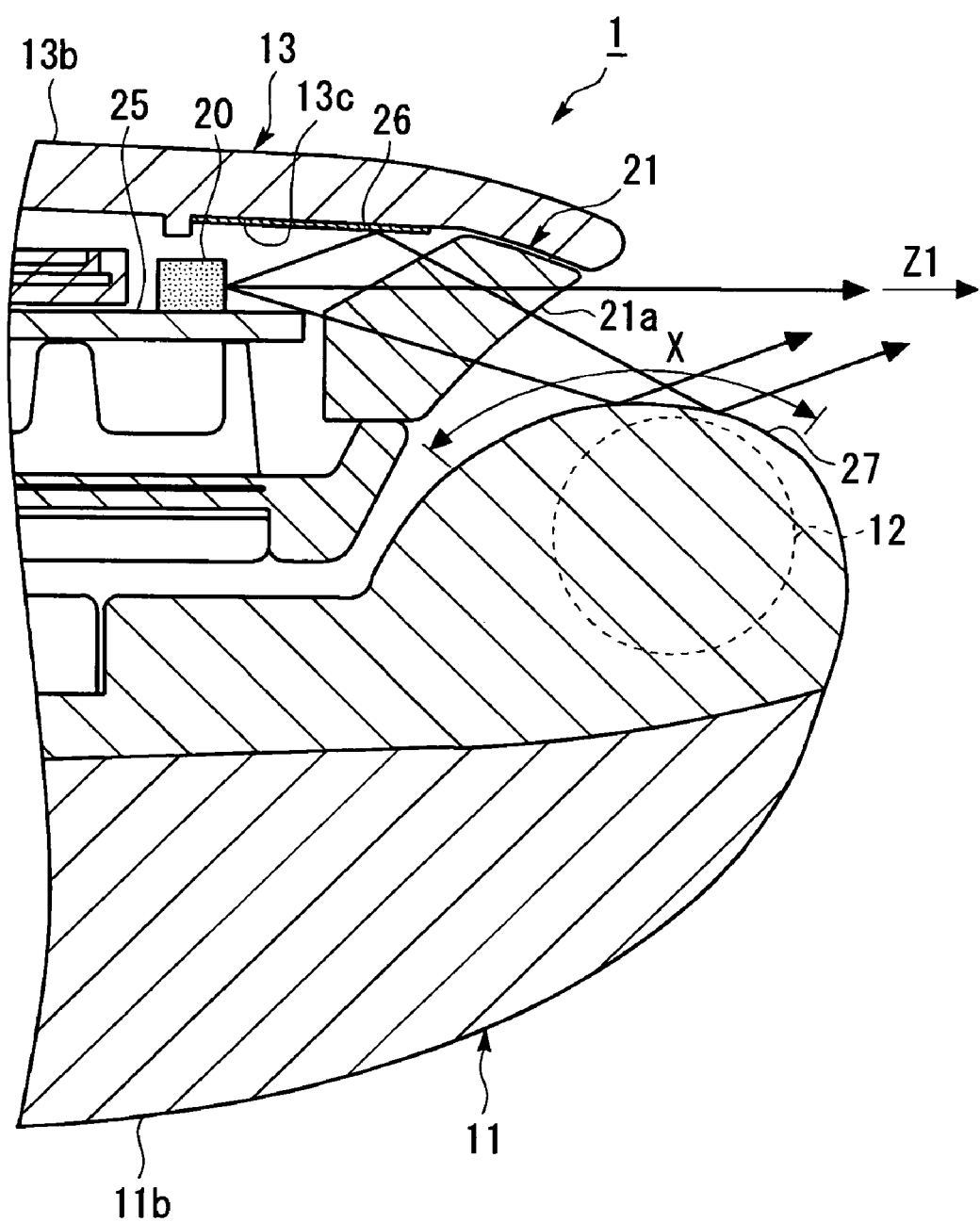
FIG. 7 is a sectional view showing how light emission is effected in the mobile phone of the present invention with the movable case closed.

FIG. 7 is a sectional view showing the state in which the movable case 13 is closed. The light diffusion panel 21 is arranged, with exposed surfaces 21a of the light diffusion panel 21 being exposed at the hinge 12 side end of the movable case 13.

As a result, the exposed surfaces 21a of the light diffusion panel 21 form the hinge 12 side end surface on the inner surface 13b side of the movable case 13. The LED 20 is arranged somewhat on the inner side of the light diffusion panel 21 of the movable case 13.

Further, on the inner wall surface 13c on the inner surface 13b side of the movable case 13, there is provided a light reflection panel 26 situated above the LED 20 and the light diffusion panel 21.

Further, at the hinge 12 side end of the stationary case 11, there is provided, as a light reflection device, a surface X extending over a predetermined range and composed, for example, of a gloss-coated portion 27 of high light reflectance, which is opposed to the exposed surfaces 21a of the light diffusion panel 21, with the movable case 13 being closed.

Figure 8:
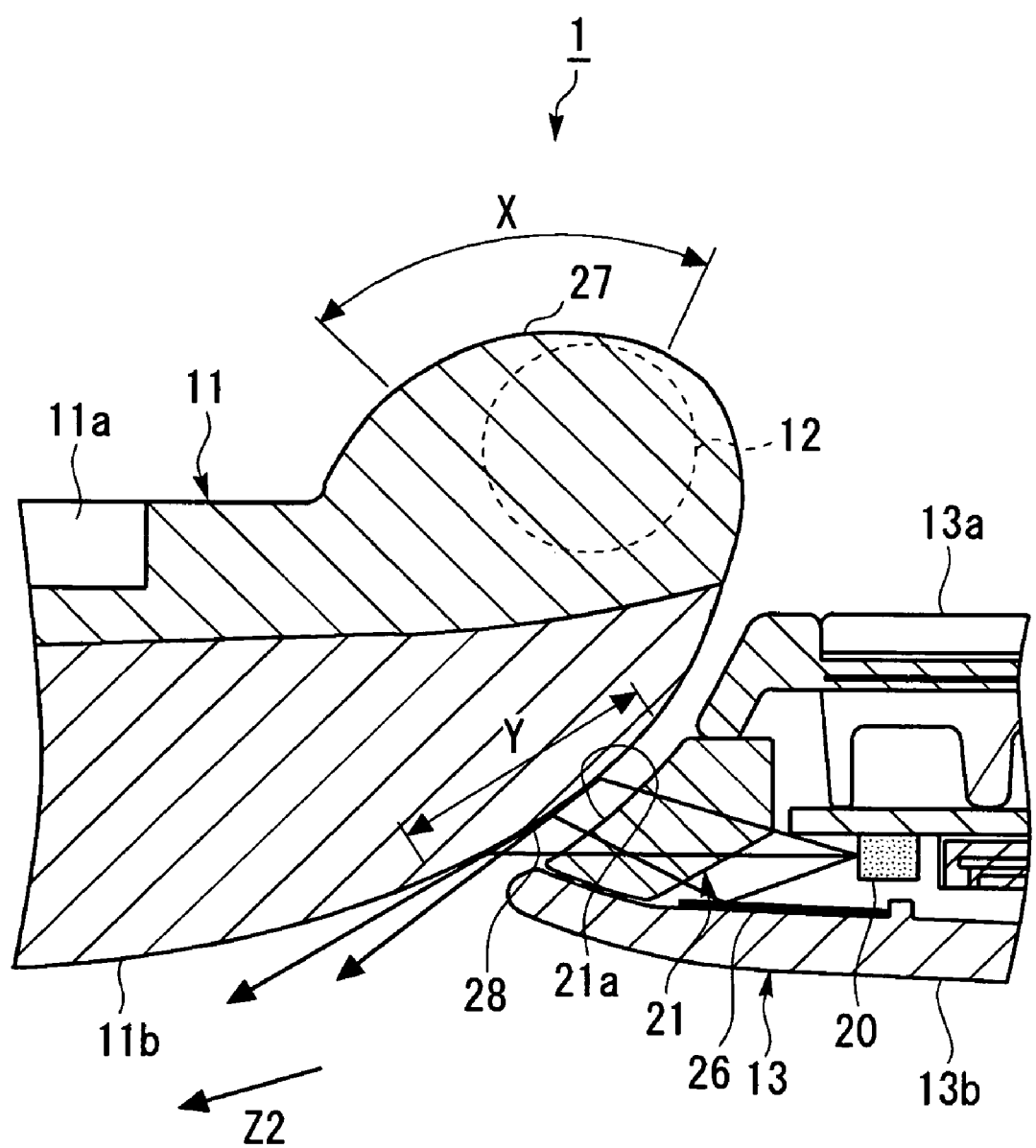
FIG. 8 is a sectional view showing how light emission is effected in the mobile phone of the present invention with the movable case open.
Figure 9:
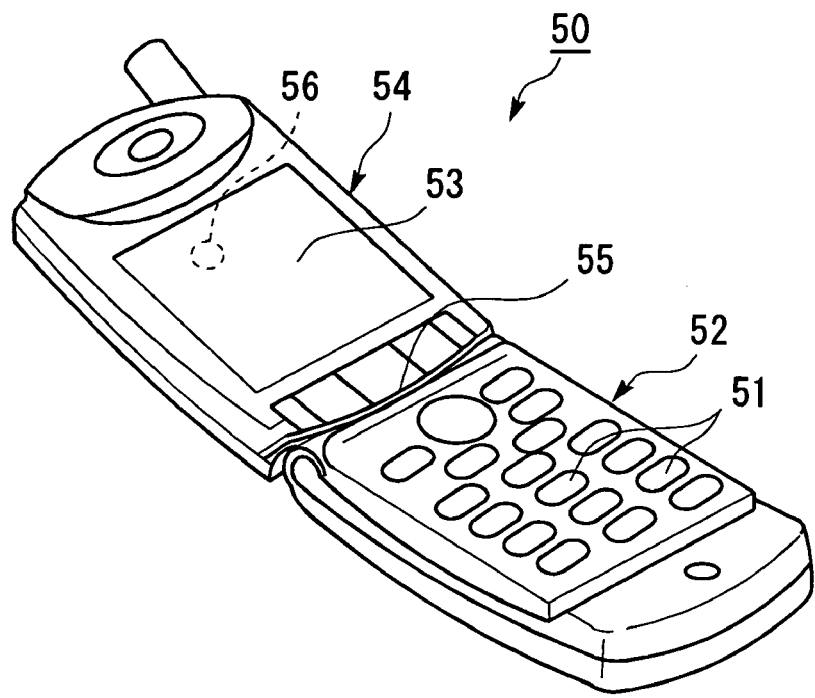
FIG. 9 is a perspective view showing a conventional mobile phone with the movable case open.
Figure 10:
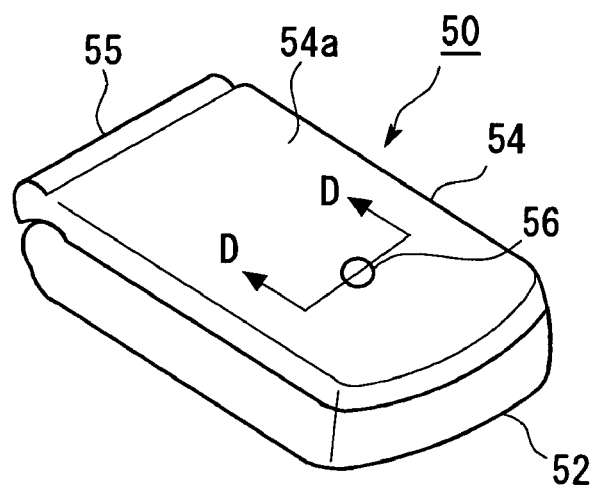
FIG. 10 is a perspective view showing the conventional mobile phone with the movable case closed.
Figure 11:
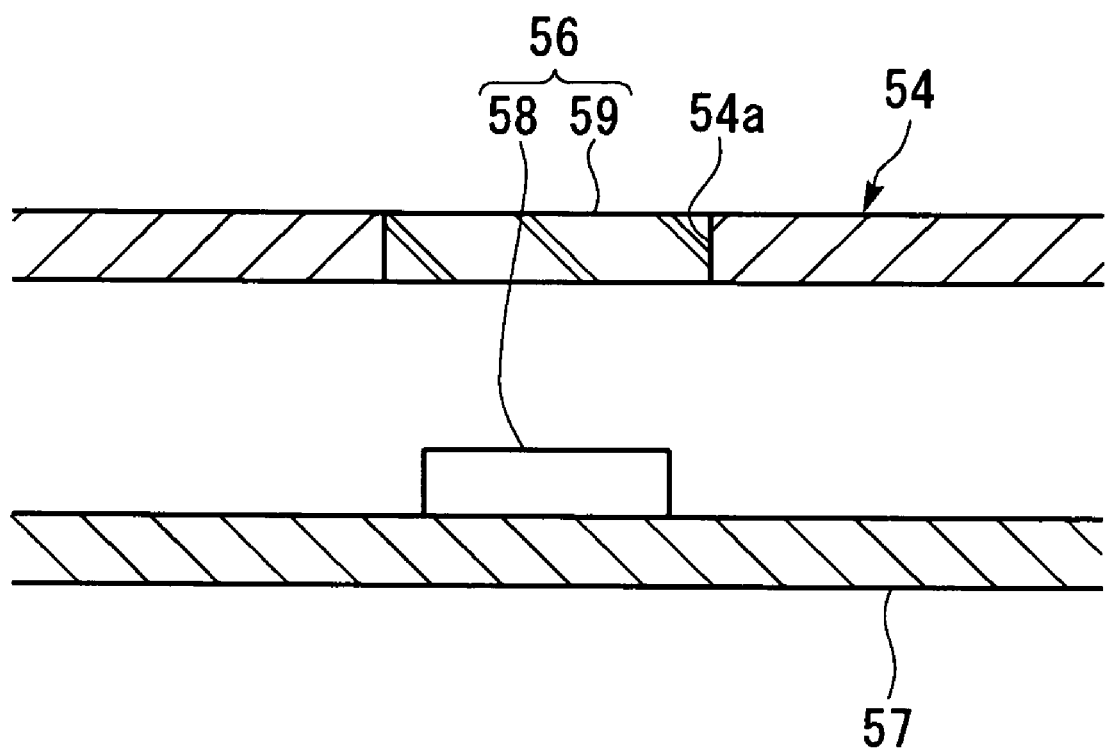
FIG. 11 is a sectional view taken along the line D-D of FIG. 10, showing the light emitting portion of the conventional mobile phone.

FIG. 8 shows the state in which the movable case 13 is open. On the outer surface 11b side of the stationary case 11, there is provided a surface Y extending over a predetermined range and composed, for example, of a gloss-coated portion 28 of high light reflectance like the gloss-coated portion 27, with the gloss-coated portion 28 being opposed to the exposed surfaces 21a of the light diffusion panel 21.

Next, the operation of the mobile phone 1 will be described. In the mobile phone 1, when, for example, the call device has received an incoming call or when the digital camera 19 is starting operation, the LED 20 of the light emitting device 14 emit light.

When the movable case 13 is closed, the LED 20 emit light as shown in FIG. 7, and their light is diffused by the light diffusion panel 21 to be applied to the gloss-coated portion 27 provided at the hinge 12 side end of the outer surface 11b of the stationary case 11. As indicated by the arrows in FIG. 7, the light applied to the gloss-coated portion 27 is reflected by the gloss-coated portion 27, and is caused to travel to the exterior of the mobile phone 1, in particular, in the longitudinal direction Z1 of the stationary cases 11.

Further, the light emitted from the LED 20 is reflected by the light reflection panel 26 provided on the inner wall surface 13c on the inner surface 13b side of the movable case 13, and is transmitted by way of the light diffusion panel 21 and the gloss-coated portion 27 before being caused to travel in the longitudinal direction Z1 of the stationary cases 11 and the movable case 13.

As shown in FIG. 8, in the state in which the movable case 13 is open, the light emitted from the LED 20 is transmitted by way of the light diffusion panel 21, the light reflection panel 26, and the gloss-coated portion 28 on the outer surface 11b side of the stationary case 11 before being caused to travel to the exterior of the mobile phone 1, in particular, in the longitudinal direction Z2 of the movable case 13.

In this way, in the mobile phone 1 according to the present invention, the light emitting device 14 which indicates with light that there is an incoming call or that the digital camera 19 is starting to operate, is provided at the hinge 12 side end of the movable case 13, so there is no need to provide the light emitting device 14 in the outer surface (cosmetic surface) 11b, 13b of the stationary case 11 and the movable case 13. Thus, it is possible to mitigate the limitation in the degree of freedom in terms of case design.

When the mobile phone 1 is to be carried in a chest pocket, the hinge 12 is placed on the upper side. As a result, the light emitting device 14 comes on the upper side, making it possible to visually recognize with ease from above the light emitted from the light emitting device 14. Thus, it is possible to reliably recognize that there is an incoming call or that the digital camera 19 is starting to operate.

In this embodiment, the exposed surfaces 21a of the light emitting device 14 form the hinge 12 side end surface of the movable case 13. Thus, when the mobile phone 1 is carried in a chest pocket, visual recognition from above of the light emission from the light emitting device 14 is further facilitated.

Further, the LED 20 and the light diffusion panel 21 of the light emitting device 14 are provided in the case in which the hinge 12 is not provided, that is, in the movable case 13 in this embodiment, so the construction of the hinge 12 and the portion in the vicinity of the same can be simplified, making it possible to prevent an increase in device size.

Further, not only is it possible to make a direct visual recognition of the light from the LED 20 by the light diffusion panel 21, but also the reflection light from the stationary case 11 can be visually recognized, so visual recognition of light emission is possible regardless of whether the stationary case 11 and the movable case 13 are open or closed.

While in the embodiment described above the present invention is applied to the mobile phone 1, this should not be construed restrictively. The present invention is also applicable to various terminal device having a function to indicate various states through light emission.

<Others>

The disclosures of Japanese patent application No. JP2005-346187 filed on Nov. 30, 2005 including the specification, drawings and abstract are incorporated herein by reference.

What is claimed is:

1. A terminal device having a stationary case and a movable case provided on the stationary case through intermediation of a hinge to allow opening and closing the terminal device comprising:
   a light emitting device provided at one of the stationary case or the movable case and at an end side of the hinge, and emitting light to outside of the terminal device through the hinge.

2. A terminal device according to claim 1, further comprising;
   a light reflection device that reflects the light from the light emitting device provided on one of the stationary case or the movable case.

3. A terminal device according to claim 1, further comprising;
   a light reflection device that reflects the light from the light emitting device provided on the hinge one of the stationary case or the movable case which dose not provided with the light emitting device.

4. A terminal device according to claim 1, further comprising;
   a gloss coated portion provided at the side end of the hinge on an outer surface of the stationary case and reflecting the light emitted from the light emitting device to the outside of the terminal device, when the movable case is closed; and
   a gloss coated portion provided at an outer surface side of the stationary case and reflecting the light emitted from the light emitting device to the outside of the terminal device, when the movable case is open.

* * * * *

UNITED STATES PATENT AND TRADEMARK OFFICE
CERTIFICATE OF CORRECTION

PATENT NO. : 7,432,822 B2 Page 1 of 1
APPLICATION NO. : 11/386945
DATED : October 7, 2008
INVENTOR(S) : Takashi Suzuki et al.

It is certified that error appears in the above-identified patent and that said Letters Patent is hereby corrected as shown below:

Column 6, Line 28, after "hinge" insert --of--.

Column 6, Line 29, change "dose" to --does--.

Column 6, Line 29, change "provided" to --provide--.

Signed and Sealed this

Thirtieth Day of December, 2008

JON W. DUDAS
*Director of the United States Patent and Trademark Office*